Dec. 21, 1965  E. A. MORGAN  3,224,641
COMBINATION ICE MACHINE AND REMOTE DRINK DISPENSER
Filed June 16, 1964
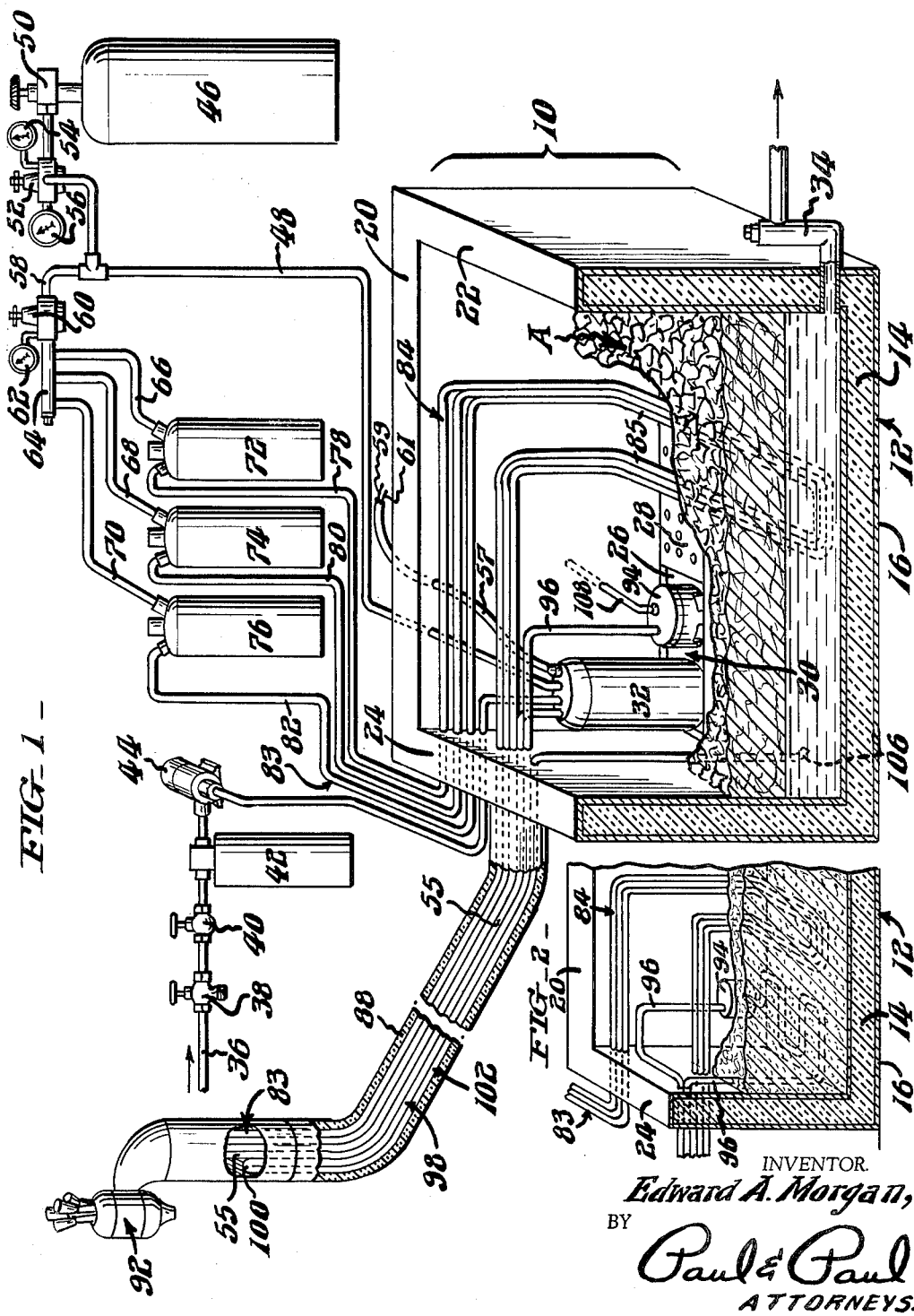
INVENTOR.
*Edward A. Morgan,*
BY
*Paul & Paul*
ATTORNEYS.

United States Patent Office

3,224,641
Patented Dec. 21, 1965

3,224,641
COMBINATION ICE MACHINE AND REMOTE
DRINK DISPENSER
Edward A. Morgan, 212 W. Franklin Ave.,
New Castle, Del.
Filed June 16, 1964, Ser. No. 375,438
4 Claims. (Cl. 222—129.1)

This invention relates generally to apparatus for dispensing beverages and particularly to such apparatus for dispensing carbonated water and flavoring syrups, such as ginger ale and cola drinks.

A principal object of the invention is to provide improved apparatus for mixing, cooling and dispensing carbonated beverages.

Another object is to provide such apparatus wherein the several ingredients of the beverage are cooled in the ice storage bin of an automatic ice making machine, and the dispensing station is remote from the storage bin.

Another object is to provide such apparatus wherein auxiliary means is provided for keeping the ingredients cool during flow thereof from the ice storage bin to the dispensing station.

Other objects of the invention will become apparent when the following description is read with reference to the accompanying drawing, in which:

FIG. 1 is a view showing diagrammatically apparatus embodying the invention; and FIG. 2 is a fragmentary view showing a modification of the apparatus shown in FIG. 1.

The following description is directed to the specific form of the invention shown in the drawing and described in the specification, and is not directed to the scope of the invention, which may be practiced in a variety of forms.

In the exemplary form of the invention shown in FIG. 1, the ice storage bin 10 of an automatic ice making machine is provided with a shell 12 made of thermally conductive sheet material and having inner and outer walls between which is a space packed with insulation material 14. The bin 10 is provided with a horizontally extending bottom wall 16, a front wall (not shown) a rear wall 20 and opposite end walls 22 and 24. Extending along the rear wall 20 is a sump 26 which is covered by a perforated plate 28 extending from the end wall 22 part way across the bin toward the end wall 24, leaving a clear space 30 adjacent to the end wall 24. In the corner of the bin where the rear wall 20 and the end wall 24 are joined together, i.e., in the clear space 30, is an auxiliary chamber provided by a conventional pressure vessel or mixing tank 32, the bottom of which rests on the bottom of the sump 26. Extending through the end wall 22 is a drain 34 arranged for maintaining a predetermined level of water in the bottom of the bin 10.

A water supply line 36 is connected to the top of the mixing tank 32. Connected in series in the line 36 are a bleed-off valve 38, a flow control valve 40, a filter unit 42 and a pump 44. A gas supply tank 46 is connected by a gas line 48 to the top of the mixing tank 32. Connected in the line 48 are a shut-off valve 50 at the top of the tank 46 and a pressure regulator 52 having associated therewith a pressure indicator 54 and a pressure indicator 56. Also connected to the top of the mixing tank 32 is a carbonated water line 55.

Suitable electrodes (not shown) within the mixing tank 32 are arranged for controlling the liquid level within the tank. Wires 59 and 61 within a cable 57 connected to the top of tank 32 are connected in electric circuit with the pump 44.

Extending from the gas line 48 is a branch 58 connected to a pressure regulator 60 mounting a pressure indicator 62. On the other side of the pressure regulator 60 is a manifold 64 from which extend lines 66, 68 and 70 connected respectively to the tops of syrup tanks 72, 74 and 76. Extending from these tanks respectively are syrup lines 78, 80 and 82 which are bunched together, as at 83. The bunched lines 83 extend horizontally through the end wall 24 of the bin, as at 84, and then are formed into a horizontally extending loop 85 disposed just above the bottom of the bin. Then the bunch of lines 83 extend horizontally through the wall 24 and through a jacket or conduit 88 of thermal insulating material to a conventional dispensing and mixing valve 92, which may be essentially of the type disclosed in Patent No. 2,653,055.

Seated on the bottom of the sump 26, next to the mixing tank 32, is a pump 94 from which extends a cold water line 96. The line extends horizontally through the end wall 24 of the bin and, with the bunch of lines 83 and the carbonated water line 55, through a conduit 88, as at 98. Near the dispensing valve 92, the line 96 turns sharply back upon itself, as at 100, and extends back through the conduit 88, as at 102, and through the end wall 24 of the bin, terminating adjacent to the bottom of the bin, as at 106. Extending from the top of the pump 94 and through the rear wall 20 is an electric cable 108 for supplying the pump with electric current.

As shown in FIG. 2, the terminal portion of the line 96 may be connected into the pump 94 so that water circulates in a closed circuit.

In the operation of the apparatus, hydrant water is supplied through valved line 36 and is filtered by the unit 42. The filtered water is supplied by the pump 44 to the mixing tank 32. At the same time, carbon dioxide gas suitably controlled by pressure regulator 52 is supplied to the mixing tank 32. The electrodes within the mixing tank control the liquid level therein. When the level of the liquid falls below a predetermined low level, the circuit to the pump 44 is closed and the pump operates to supply water to the mixing tank. When the liquid level rises above a predetermined high level of water, the circuit to the pump 44 is opened, thereby terminating operation of the pump. The mixture of water and carbon dioxide is forced out of the tank through the line 55 by the pressure of the gas.

Gas suitably controlled by the pressure regulator 60 is supplied through lines 66, 68 and 70 to the syrup tanks 72, 74 and 76. The gas forces the syrup out of the tanks and through the lines 78, 80 and 82, which lines, as stated hereinbefore, are bunched together, as at 83, and formed into a loop, as at 85. The loop 85 is buried in a bed of ice A covering the bottom of the bin, and the syrups flowing in the bunched conduits are thoroughly cooled while passing through the loop 85. At the same time, the water accumulating on the bottom of the bin, formed by melting ice, is kept at a predetermined level by the drain 32. The pump 94 being submerged in the water operates to pump the water through the line 96 and return the same to the bottom of the bin. The syrup lines and the carbonated water line are bunched with the sections 98 and 102 of the line 96 and are kept cool thereby. Thus, the conduit 96 serves as an auxiliary cooling means, this being an important feature particularly when the valve 92 is remote from the bin.

Referring to FIG. 2, instead of discharging cold water from the conduit 96 directly onto the bottom of the bin through the open end 106 of the conduit, both ends of the conduit 96 may be connected to the pump 94 so that cold water circulates in a closed circuit. In this event, there is no need for allowing water to accumulate on the bottom of the bin.

It will be readily apparent that the herein described apparatus has as a principal advantage thereof the utilization of a single refrigerating unit to accomplish dual refrigeration effects. That is, in accordance with this invention a conventional automatic ice making machine may be utilized not only to supply manufactured ice, but may also be used to refrigerate an independent beverage cooling and dispensing system.

What is claimed is:

1. In apparatus for mixing, cooling and dispensing carbonated beverages, the combination comprising a machine including means providing a bin, means providing an auxiliary chamber within said bin, means for charging said chamber with water and carbon dioxide gas in controlled quantities for being mixed therein, said machine being operable for maintaining said bin charged with a bed of ice for cooling the mixed water and carbon dioxide gas within said chamber, a conduit for conducting the cooled carbonated water from said chamber to a dispensing station remote from said bin, at least one conduit for conducting flavoring syrup from a source thereof to said dispensing station, a section of said syrup conducting conduit substantial in length being arranged within said bin for exposure to said ice whereby the syrup therein is effectively cooled, a valve at said dispensing station operable for controlling discharge of carbonated water and syrup from said conduits, and auxiliary means for maintaining the contents of said conduits cool during passage thereof from said bin to said dispensing station including a cold water conduit having a section extending from the interior of said bin to said dispensing station and a section returning from said dispensing station to the interior of said bin, a pump connected in said cold water conduit and operable for circulating cold water, both of said sections of the cold water conduit being bunched with said carbonated water and syrup conducting conduits to facilitate heat transfer therebetween.

2. The combination defined in claim 1 wherein the pump is disposed for taking up cold water directly from the bottom of the bin, the delivery side of said pump is connected to one end of the cold water conduit, and the other end of said cold water conduit is arranged to return said cold water to the bottom of said bin for recirculation thereof.

3. The combination defined in claim 1 wherein the pump and cold water conduit are connected in closed circuit, a section of said cold water conduit substantial in length being arranged within said bin for exposure to said ice whereby the water therein is effectively cooled.

4. The combination defined in claim 1 wherein the bunched conduits are in direct contact with each other and encased in a jacket of thermal insulating material.

References Cited by the Examiner

UNITED STATES PATENTS

| | | | |
|---|---|---|---|
| 2,010,060 | 8/1935 | Copeman | 62—390 X |
| 2,328,110 | 8/1943 | Thompson et al. | 222—129.1 X |
| 2,462,019 | 2/1949 | Bowman | 222—129.4 X |
| 2,617,510 | 11/1952 | Little. | |
| 2,630,259 | 3/1953 | Stein et al. | 222—131 X |
| 2,776,074 | 1/1957 | St. Laurence | 222—129.4 X |
| 2,850,213 | 9/1958 | Cole | 222—129.4 X |
| 2,986,306 | 5/1961 | Cocanour | 222—129.' |
| 3,058,620 | 10/1962 | Kromer | 62—390 X |
| 3,180,529 | 4/1965 | Buffington | 222—131 |

RAPHAEL M. LUPO, *Primary Examiner.*